V. WINQUIST.
TIRE RIM CONTRACTOR.
APPLICATION FILED SEPT. 4, 1917.
1,381,383.
Patented June 14, 1921.
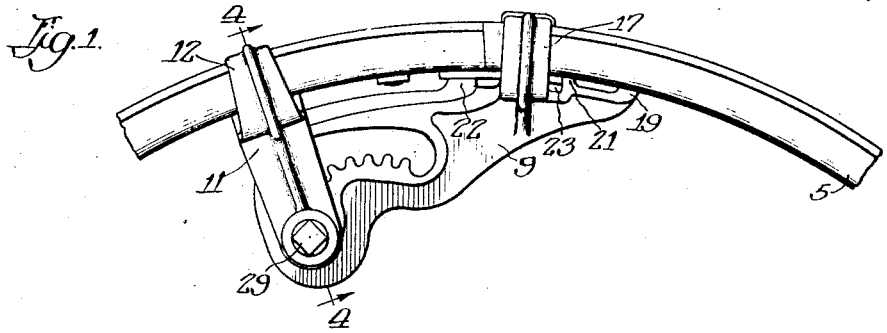
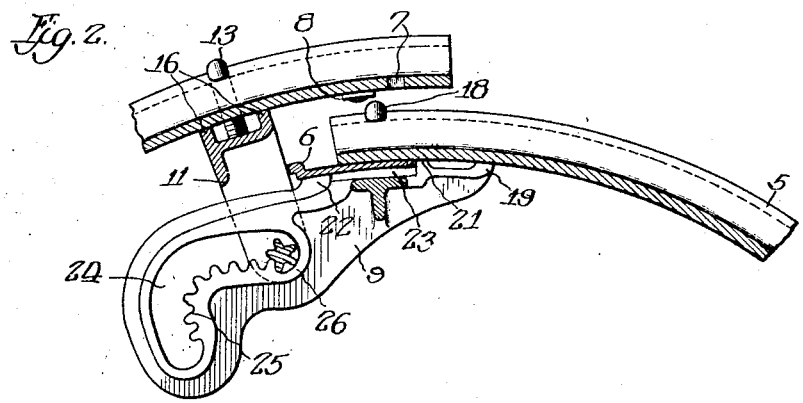
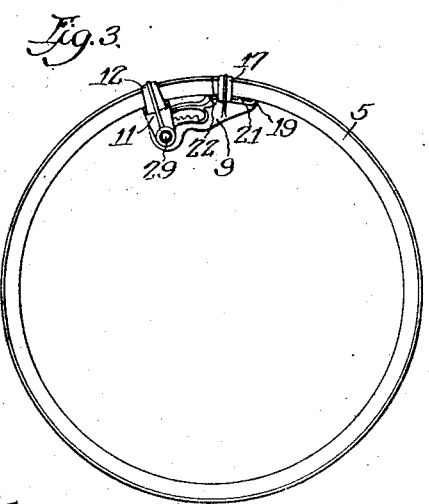
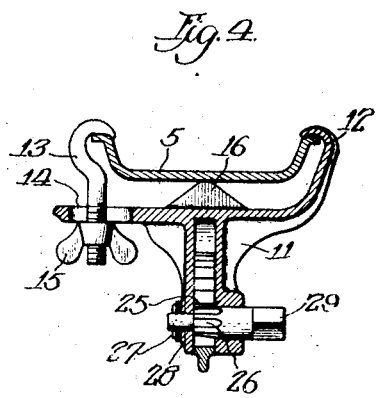
Witnesses:
C. H. Roesner.
R. Burkhard.
Inventor:
Victor Winquist
By Pond & Bellow Attys.

UNITED STATES PATENT OFFICE.

VICTOR WINQUIST, OF ROCKFORD, ILLINOIS, ASSIGNOR, BY MESNE ASSIGNMENTS, OF TWO-THIRDS TO BURD HIGH COMPRESSION RING COMPANY, OF ROCKFORD, ILLINOIS, A CORPORATION OF ILLINOIS.

TIRE-RIM CONTRACTOR.

1,381,383.  Specification of Letters Patent.  Patented June 14, 1921.

Application filed September 4, 1917. Serial No. 189,640.

*To all whom it may concern:*

Be it known that I, VICTOR WINQUIST, a citizen of the United States, residing at Rockford, in the county of Winnebago and State of Illinois, have invented certain new and useful Improvements in Tire-Rim Contractors, of which the following is a specification.

This invention pertains to the art of tire-rim contractors which are employed for the purpose of contracting demountable split tire-rims so that pneumatic tires can be readily removed from and replaced on the rims.

One of the salient features of this invention resides in the provision of a pair of members, each adapted to be securely attached to the respective ends of a split tire rim by novel attaching means capable of adjustment to rims of various widths, and also in the provision of a simple and highly efficient connection between these two members by manipulation of which, relative movement will be imparted to the members to first break the rim lock and then draw the rim ends into overlapped relation and automatically lock them in this position to facilitate removal and replacement of the tire. The same mechanism when operated in the reverse direction is adapted to restore the rim ends to normal expanded position in which they are locked when in use.

Another feature of my invention resides in the extreme simplicity of the device and in the fact that it is cheap to manufacture and is small in size, so that it takes up but little room in a tool box.

Other advantageous features of my invention will be readily appreciated as the same is better understood from the following description when considered in connection with the accompanying drawings.

Referring to the drawings,—

Figure 1 is a side elevation of one embodiment of my invention shown as applied to a rim prior to the contraction of the rim;

Fig. 2 is a similar view partially in section, showing the position of the parts when the rim ends have been moved into overlapped relation;

Fig. 3 is a side elevation similar to Fig. 1, but showing a complete rim; and

Fig. 4 is a sectional view on the line 4—4 of Fig. 1.

On the drawings reference character 5 indicates generally a split demountable tire-rim, the one chosen for purposes of illustration being commercially known as the Kelsey rim, having a straight transverse split, and one end being provided with a locking member 6 shaped as shown in Fig. 2 and adapted to be seated in a slot 7 formed in the opposite end of the rim, a latch 8 pivoted near the slot 7 being adapted to be swung partially over the slot so as to overlie the end of the locking member 6 and prevent its withdrawal from the slot. It will be appreciated, however, that my invention is equally capable of application to other types of rims.

The contractor embodying my invention comprises two members, 9 and 11 respectively, each adapted to be connected to a respective end of the rim 5. The member 11, for instance, is shaped to provide a jaw 12 adapted to hook over one of the flanges of a rim and at its other side there is provided an adjustable jaw 13 shaped to hook over the other flange of the rim. The jaw 13 which, as is evident from Fig. 4, is hook-shaped at its upper end and threaded at its lower end, extends through a slot 14 formed in the body of the member 11 so that this jaw can be moved laterally to accommodate rims of various widths. A thumb nut 15 threaded upon the lower end of the jaw is adapted to clamp the jaw firmly down upon the rim flange. A rigid clamping of both the jaws 12 and 13 when the thumb nut 15 is tightened up is secured by the provision of a fulcrum point or abutment 16 which is formed integrally with the body of the member 11 between the jaws 12 and 13 in position to engage the inner face of the tire-rim. It will be manifest that when the jaw 12 is hooked over one flange of the rim and the jaw 13 over the other the tightening of the thumb nut 15 will cause both jaws to simultaneously and firmly grip the edges of the rim flange so that the rim is securely gripped by the two jaws and the fulcrum point 16 and slippage of the member longitudinally of the rim is thereby precluded.

The other member 9 is similarly provided with a rigid jaw 17 and an adjustable jaw 18, and likewise has a fulcrum bearing intermediate the jaws, this bearing in the contractors designed for the particular rim shown consisting preferably of three points of contact, 19, 21 and 22 respectively, the point 22 underlying the extending portion of the rim-locking member 6, the points 19 and 21 engaging the inner face of the rim. It will be noted from Fig. 2 that a depression 23 is formed between the points 21 and 22 and that the bearing portion 21 is longer than the bearing point 22, approximately the thickness of the locking member 6, so that the projection 21 provides an abutment adapted to engage the end of the locking member, thereby providing additional security against slippage of the clamp longitudinally of the rim.

The member 9 is extended circumferentially of the rim beyond the clamp and is provided with a slot 24 shaped as shown on the drawings, this slot being equipped with rack teeth 25. The member 11 is bifurcated to straddle the extension of the member 9 and is provided near its lower end with bearing openings in which a pinion 26 is rotatably mounted. A cotter pin 27 or other preferred means retains the pinion in its bearings and, preferably, a washer 28 is interposed between the pin and the adjacent face of the member 11. The opposite end of the pinion shaft is made square or hexagonal in shape, as indicated at 29, to fit the wrench which is customarily used to remove the nuts which clamp a demountable rim to the felly of the auto wheel.

When the device is to be used it is securely attached to the rim in the position shown in Figs. 1 and 3, the member 9 being first securely clamped to one end of the rim with the abutment 21 disposed against the end of the locking member 6, as previously described, and the member 11 securely clamped to the other end of the rim as shown. The wrench is now applied to the pinion spindle and turned in a clockwise direction. The engagement of the pinion with the rack teeth first causes the members 9 and 11 to move in opposite directions radially of the rim so as to withdraw the locking member from the slot 7. The radially depressed portion of the slot 24 in the member 9 is of sufficient length to insure removal of the locking member 6 from the slot, and after the pinion has reached the top of the slot it travels circumferentially of the rim along the rack teeth so as to bring the rim ends into the overlapped position shown in Fig. 2, thereby reducing the diameter of the rim so that the tire can be readily removed and replaced. When the pinion reaches the end of the slot, as shown in Fig. 2, the direction of the stresses imposed by the rim upon the two members 9 and 11 is such that the pinion is forced downwardly against the lower end wall of the slot which precludes any tendency to reverse rotation of the pinion, and the rim ends are consequently automatically locked in overlapped relation. The tire may now be removed and replaced while the contractor holds the rim ends in the position shown in Fig. 2, whereupon the wrench is again applied to the spindle and the pinion is rotated in the reverse direction. This action returns the rim ends to normal position and forces the locking member 6 back into the slot 7 so that the latch 8 may be returned into locking position to securely hold the rim ends before the contractor is removed from the rim.

It will be evident from the foregoing that I have provided a rim contractor which is compact in form, so that it takes up but little room, is extremely cheap to manufacture, since most of the parts may be cast, and is easy to attach to a rim and manipulate and again detach therefrom. While I have shown and described a preferred embodiment of my invention it should be understood that the size, shape, proportion and arrangement of the various parts can be varied considerably without departing from the essence of my invention as set forth in the following claims.

I claim:

1. A tire-rim contractor comprising a pair of members adapted to be engaged respectively with the opposed ends of a split tire-rim, a rotatable pinion carried by one of said members, and a rack on the other member coöperable with said pinion and shaped so that upon rotation of the latter a relative movement between said members will be effected first radially of the rim and then circumferentially thereof to dispose the rim ends in overlapped position.

2. A tire-rim contractor comprising a pair of members adapted to be engaged with the opposed ends respectively of a split rim, and a rotatable pinion carried by one of said members, the other member being shaped to provide a radially and circumferentially extending rack for engagement by said pinion so that upon rotation of the latter the members will be moved relatively to each other to dispose the rim ends in overlapped position.

3. A tire-rim contractor comprising a pair of members adapted to be connected respectively with the ends of a tire rim, one of said members being provided with an elongated slot extending in a radial and circumferential direction, and a rotatable device carried by the other member and operatively disposed in said slot and operable to follow the contour thereof so that upon rotation of said device the members will be moved relatively to each other to position the rim ends in overlapped relation.

4. A tire-rim contractor comprising a pair of members adapted to be engaged respectively with the ends of a split rim, one of said members being provided with a slot having rack teeth therein, a pinion rotatably carried by the other member and engageable with said rack teeth, said rack and pinion being shaped to contract the tire rim when the pinion is revolved and to automatically lock the rim ends in overlapped relation.

5. A tire-rim contractor comprising a pair of members adapted to be connected respectively with the ends of a split tire-rim, and means comprising a curved rack and a pinion mounted respectively upon said members and relatively arranged so that the travel of the pinion will be in a radial and circumferential direction for overlapping the rim ends and returning them to normal locked position upon rotation of said pinion in opposite directions.

6. A tire-rim contractor comprising a pair of members adapted to be connected with the ends of a tire-rim, one of said members being provided with a rotatable pinion and the other being provided with a curved slot equipped with rack teeth and said pinion being disposed in said slot and in engagement with said teeth so as to impart relative movement to the rim ends upon rotation of said pinion.

7. A tire-rim contractor, comprising a pair of members adapted to be connected with the ends of a tire rim, one of said members having a portion provided with a radially and circumferentially extending way, the other member being constructed to provide arms disposed on both sides of said portion, and means mounted upon said arms and coöperating intermediate the same with said way so as to be guided thereby in a radial and circumferential direction for moving the rim ends into overlapped relation.

8. A tire-rim contractor, comprising a pair of members adapted to be connected with the ends of a tire rim, one of said members being equipped with a rotatable device and the other being provided with a surface upon which said rotatable device is operable, said rotatable device and surface being shaped so that rotation of the device will produce from coöperation thereof with said surface, relative movement of said members in a radial and circumferential direction to thereby position the rim ends in overlapped relation.

VICTOR WINQUIST.